(12) United States Patent
Natanzon et al.

(10) Patent No.: US 10,067,837 B1
(45) Date of Patent: Sep. 4, 2018

(54) CONTINUOUS DATA PROTECTION WITH CLOUD RESOURCES

(71) Applicant: EMC Corporation, Hopkinton, MA (US)

(72) Inventors: Assaf Natanzon, Tel Aviv (IL); Ran Goldschmidt, Herzeliya (IL); Yair Cohen, Pardes Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 14/980,032

(22) Filed: Dec. 28, 2015

(51) Int. Cl.
| G06F 17/30 | (2006.01) |
| G06F 11/14 | (2006.01) |
| G06F 21/62 | (2013.01) |

(52) U.S. Cl.
CPC ...... *G06F 11/1451* (2013.01); *G06F 11/1464* (2013.01); *G06F 11/1471* (2013.01); *G06F 21/6245* (2013.01); *G06F 2201/84* (2013.01)

(58) Field of Classification Search
CPC .................................................. G06F 11/1451
See application file for complete search history.

(56) References Cited

U.S. PATENT DOCUMENTS

| 5,170,480 | A | 12/1992 | Mohan et al. |
| 5,249,053 | A | 9/1993 | Jain |
| 5,388,254 | A | 2/1995 | Betz et al. |
| 5,499,367 | A | 3/1996 | Bamford et al. |
| 5,526,397 | A | 6/1996 | Lohman |
| 5,864,837 | A | 1/1999 | Maimone |
| 5,879,459 | A | 3/1999 | Gadgil et al. |
| 5,990,899 | A | 11/1999 | Whitten |
| 6,042,652 | A | 3/2000 | Hyun et al. |
| 6,065,018 | A | 5/2000 | Beier et al. |
| 6,143,659 | A | 11/2000 | Leem |
| 6,148,340 | A | 11/2000 | Bittinger et al. |
| 6,174,377 | B1 | 1/2001 | Doering et al. |
| 6,174,809 | B1 | 1/2001 | Kang et al. |
| 6,203,613 | B1 | 3/2001 | Gates et al. |
| 6,260,125 | B1 | 7/2001 | McDowell |

(Continued)

FOREIGN PATENT DOCUMENTS

| EP | 1154356 | 11/2001 |
| WO | WO 00 45581 A3 | 8/2000 |

OTHER PUBLICATIONS

Gibson, "Five Point Plan Lies at the Heart of Compression Technology;" Tech Talk; Apr. 29, 1991; 1 Page.

(Continued)

*Primary Examiner* — Syed H Hasan
(74) *Attorney, Agent, or Firm* — Daly, Crowley Mofford & Durkee, LLP

(57) ABSTRACT

In one aspect, a method includes storing a virtual machine disk in a first logical unit stored on a data store; replicating the first virtual machine disk used by a first virtual machine at a second virtual machine disk stored on a second logical unit on a cloud array storage device; storing changes to the first virtual machine disk on a journal stored on the data store; periodically rolling each virtual machine disk of virtual machines on the second logical unit to a same-point-in-time using the journal and taking a snapshot of the second logical unit at the same point-in-time and sending the snapshots to a cloud storage network.

16 Claims, 6 Drawing Sheets

(56) References Cited

U.S. PATENT DOCUMENTS

| | | |
|---|---|---|
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | Dekoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |

(56) References Cited

U.S. PATENT DOCUMENTS

| | | |
|---|---|---|
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |
| 9,678,680 B1 | 6/2017 | Natanzon et al. |
| 9,678,728 B1 | 6/2017 | Shemer et al. |
| 9,684,576 B1 | 6/2017 | Natanzon et al. |
| 9,690,504 B1 | 6/2017 | Natanzon et al. |
| 9,696,939 B1 | 7/2017 | Frank et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | Debetteneourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2013/0262390 A1* | 10/2013 | Kumarasamy ...... H04L 41/0846 707/649 |
| 2014/0195484 A1* | 7/2014 | Wang ................ G06F 17/30215 707/624 |
| 2015/0039815 A1* | 2/2015 | Klein .................. G06F 12/0246 711/103 |
| 2015/0227602 A1* | 8/2015 | Ramu ............... G06F 17/30575 707/634 |

OTHER PUBLICATIONS

Soules et al., "Metadata Efficiency in Versioning File Systems;" 2$^{nd}$ USENIX Conference on File and Storage Technologies; Mar. 31, 2003-Apr. 2, 2003; 16 Pages.

AIX System Management Concepts: Operating Systems and Devices; Bull Electronics Angers; May 2000; 280 Pages.

Soules et al., "Metadata Efficiency in a Comprehensive Versioning File System;" May 2002; CMU-CS-02-145; School of Computer Science, Carnegie Mellon University; 33 Pages.

"Linux Filesystems," Sams Publishing; 2002; Chapter 1: Introduction to Filesystems pp. 17-22 and Chapter 3: Overview of Journaling Filesystems pp. 67-71; 12 Pages.

Bunyan et al., "Multiplexing in a BrightStor® ARCserve® Backup Release 11;" Mar. 2004; 4 Pages.

Marks, "Network Computing, 33;" Cover Story; Feb. 2, 2006; 8 Pages.

Hill, "Network Computing, NA;" Cover Story; Jun. 8, 2006; 9 Pages.

Microsoft Computer Dictionary, Fifth Edition; 2002; 3 Pages.

Wikipedia; Retrieved on Mar. 29, 2011 from http://en.wikipedia.org/wiki/DEFLATE: Deflate; 6 Pages.

Wikipedia; Retrieved on Mar. 29, 2011 from http://en.wikipedia.org/wiki/Huffman_coding: Huffman Coding; 11 Pages.

Wikipedia; Retrieved on Mar. 29, 2011 from http:///en.wikipedia.org/wiki/LZ77: LZ77 and LZ78; 2 Pages.

Image File Wrapper from U.S. Appl. No. 11/609,560 downloaded Jan. 7, 2015; 265 Pages.

Image File Wrapper from U.S. Appl. No. 12/057,652 downloaded Jan. 7, 2015; 296 Pages.

Image File Wrapper from U.S. Appl. No. 11/609,561 downloaded Jan. 7, 2015; 219 Pages.

Image File Wrapper from U.S. Appl. No. 11/356,920 downloaded Jan. 7, 2015; 272 Pages.

Image File Wrapper (Part 1 of 2) from U.S. Appl. No. 10/512,687 downloaded Jan. 7, 2015; 300 Pages.

Image File Wrapper (Part 2 of 2) from U.S. Appl. No. 10/512,687 downloaded Jan. 7, 2015; 254 Pages.

(56) References Cited

OTHER PUBLICATIONS

Image File Wrapper from U.S. Appl. No. 11/536,233 downloaded Jan. 7, 2015; 256 Pages.
Image File Wrapper from U.S. Appl. No. 11/536,215 downloaded Jan. 7, 2015; 172 Pages.
Image File Wrapper from U.S. Appl. No. 11/536,160 downloaded Jan. 7, 2015; 230 Pages.
Image File Wrapper from U.S. Appl. No. 11/964,168 downloaded Jan. 7, 2015; 222 Pages.

* cited by examiner

CONTINUOUS DATA PROTECTION WITH CLOUD RESOURCES

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes storing a virtual machine disk in a first logical unit stored on a data store; replicating the first virtual machine disk used by a first virtual machine at a second virtual machine disk stored on a second logical unit on a cloud array storage device; storing changes to the first virtual machine disk on a journal stored on the data store; periodically rolling each virtual machine disk of virtual machines on the second logical unit to a same-point-in-time using the journal and taking a snapshot of the second logical unit at the same point-in-time and sending the snapshots to a cloud storage network.

In another aspect, an apparatus includes electronic hardware circuitry configured to store a virtual machine disk in a first logical unit stored on a data store; replicate the first virtual machine disk used by a first virtual machine at a second virtual machine disk stored on a second logical unit on a cloud array storage device; store changes to the first virtual machine disk on a journal stored on the data store; periodically roll each virtual machine disk of virtual machines on the second logical unit to a same-point-in-time using the journal and taking a snapshot of the second logical unit at the same point-in-time; and send the snapshots to a cloud storage network.

In a further aspect, an article includes a non-transitory computer-readable medium that stores computer-executable instructions. The instructions cause a machine to store a virtual machine disk in a first logical unit stored on a data store; replicate the first virtual machine disk used by a first virtual machine at a second virtual machine disk stored on a second logical unit on a cloud array storage device; store changes to the first virtual machine disk on a journal stored on the data store; periodically roll each virtual machine disk of virtual machines on the second logical unit to a same-point-in-time using the journal and taking a snapshot of the second logical unit at the same point-in-time; and send the snapshots to a cloud storage network.

DETAILED DESCRIPTION

Described herein are techniques to perform data protection in a cloud environment.

The following definitions may be useful in understanding the specification and claims.

I/O REQUEST—an input/output request (sometimes referred to as an I/O or IO), which may be a read I/O request (sometimes referred to as a read request or a read) or a write I/O request (sometimes referred to as a write request or a write).

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Figure 1:
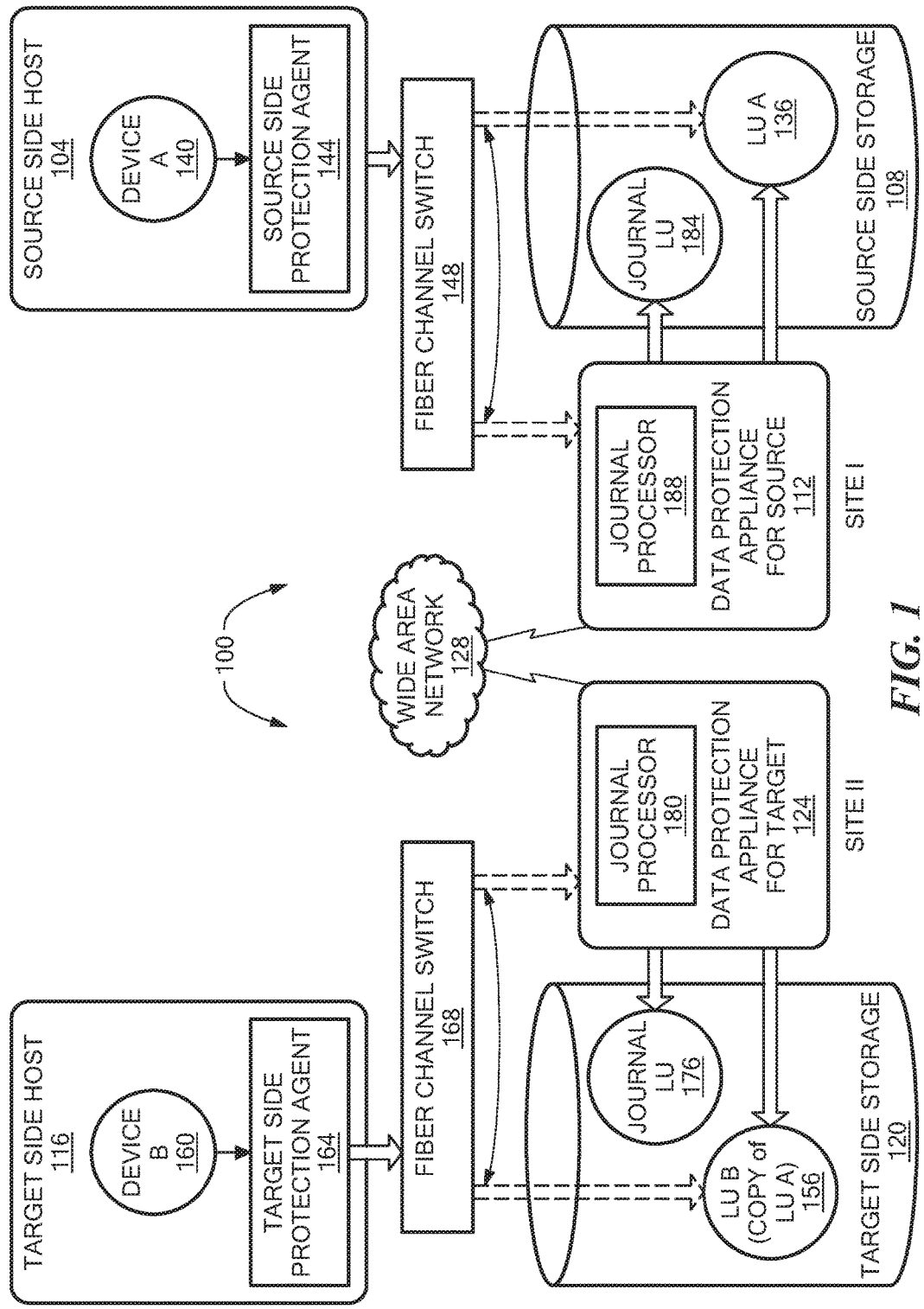
FIG. 1 is a block diagram of an example of a data protection system.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMWARE® VMFS®). In particular, the hypervisor generates files in the file system and exposes the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one example, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer generates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
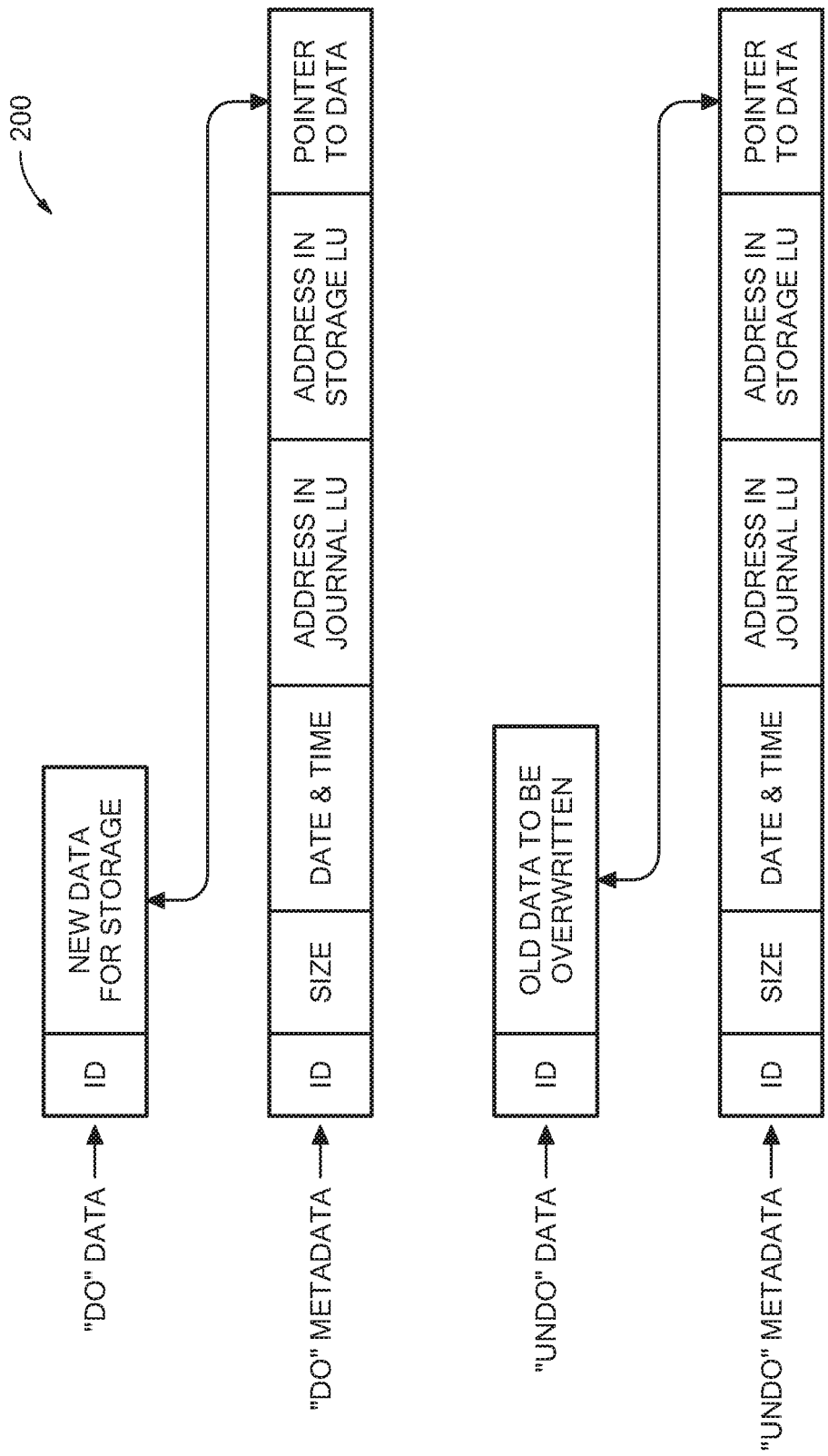
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal includes the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
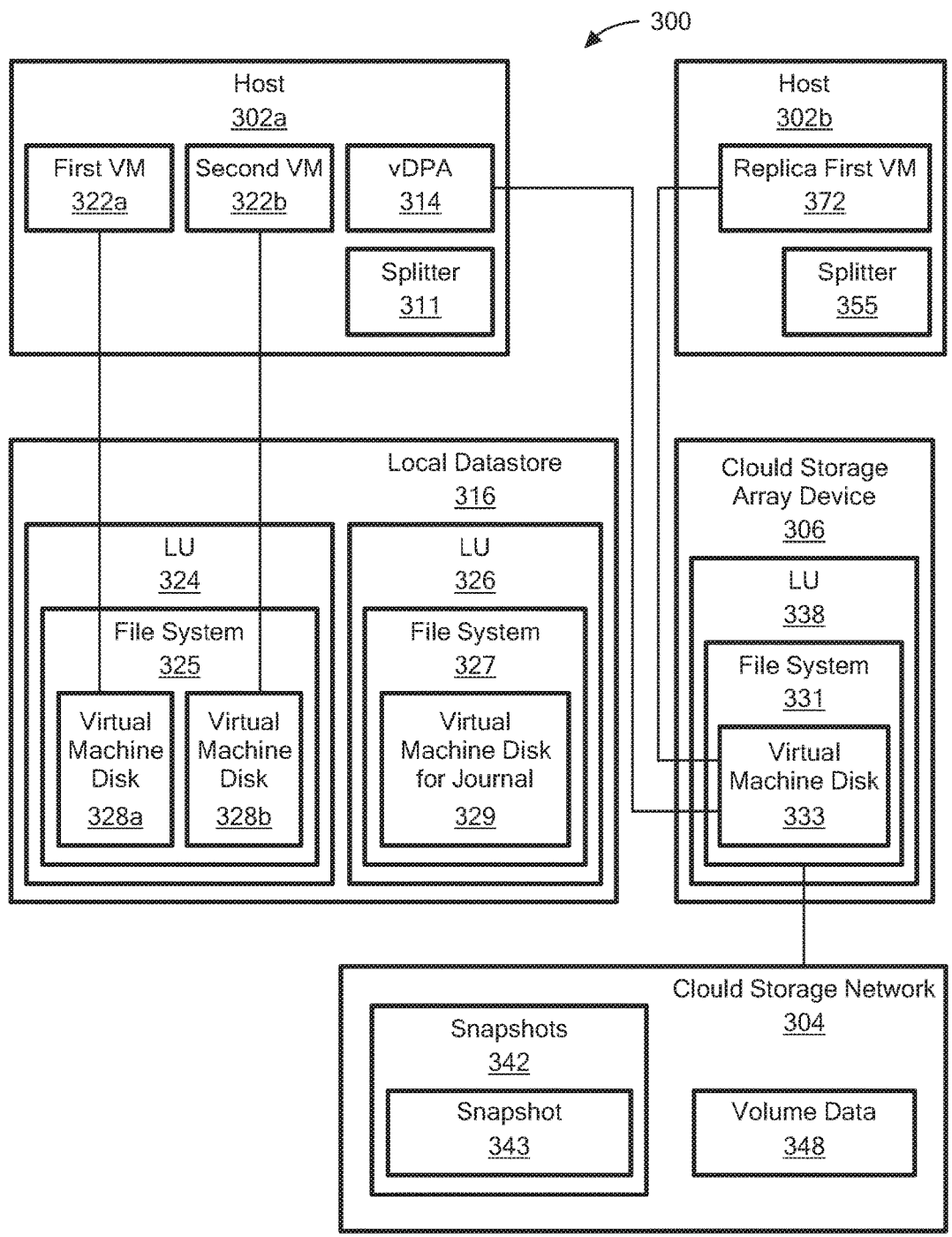
FIG. 3 is a block diagram of an example of a system to provide data protection in a cloud environment, according to one embodiment of the disclosure.

Referring to FIG. 3, the point-in-time CDP described in FIGS. 1 and 2 may be extended to a cloud environment, according to one embodiment of the disclosure. In one example, a system 300 includes a host 302a, a host 302b, a cloud storage network 304, a cloud storage device 306 and a local data store 316.

The host 302a includes a first virtual machine (VM) 322a, a second virtual machine 322b, a splitter 311 and a virtual data protection appliance (vDPA) 314. The host 302b includes a splitter 355 and a replica of the first VM 372.

The local data store includes a logical unit (LU) 324 having a file system 325 (e.g., VMWARE® VMFS®) exposing a virtual machine disk 328a and a virtual machine disk 328b and a LU 326 having a file system 327 exposing a virtual machine disk 329 used for a journal (also called herein journal 329). In one particular example, the journal 329 is similar to a four stream journal (e.g., journal 176 described in FIGS. 1 and 2).

The cloud storage array device 306 includes a LU 338 having a file system 331 (e.g., VMWARE® VMFS®) exposing a virtual machine virtual machine disk 333 which is the replica of virtual machine disk 328a. The cloud storage array device 306 stores a portion of the cloud storage. For example, if the cloud storage is allocated 1 TB of storage only 10 GB is on the cloud storage array device 306 and the rest is on the cloud storage network 304, i.e. the cloud storage array device 306 serves as a cache for cloud storage data 348.

The cloud storage network 304 includes snapshots 342 of the virtual machine disk 333 and volume data 348 of the cloud storage device 306. The snapshots 342 include a snapshot 343, which is a snapshot of the LU 338.

The first virtual machine 322a uses virtual machine disk 328a as storage. The second virtual machine 322b uses virtual machine disk 328b for storage. In one example, the virtual machine disk 328a is replicated to the virtual machine disk 333 of the cloud storage device 306 and the virtual machine disk 328b is not replicated as virtual machine 322b is not replicated.

In most embodiments, the cloud storage network 304 is an object-based storage stored in a cloud (e.g., AMAZON S3 or any other object-based cloud storage). In one example, the cloud storage array device 306 may be, for example, EMC® CLOUDARRAY®.

Figure 4:
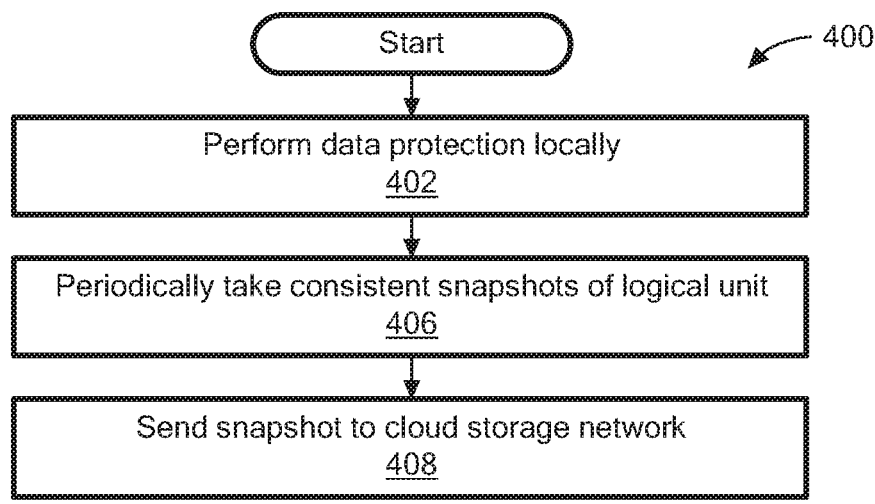
FIG. 4 is a flowchart of an example of a process to perform data protection in a cloud environment, according to one embodiment of the disclosure.

Referring to FIG. 4, a process 400 is an example of a process to perform data protection in a cloud environment, according to one embodiment of the disclosure. Process 400 performs data protection locally (402). For example, a replica of the virtual machine disk 328a is taken and stored with the virtual machine disk 333 and subsequent changes to the virtual machine disk 328a are stored on the journal 329.

Process 400 periodically takes a consistent snapshot of a logical unit containing storage for the virtual machines (406). For example, the snapshot 343 is taken of LU 338 at a consistent point-in-time. The cloud storage array device 306 exposes an LU, and copies of the full LU are stored in the object store in the cloud storage array network 304 as snapshots 342. In order to get a consistent view of the disk of the virtual machines stored in LU 338, each of the data stored in the disks are rolled to the same consistent point-in-time using the journal 329 and only then when the data of the virtual machines is paused on a consistent point-in-time a snapshot of LU 338 is taken.

Process 400 sends the snapshot of the logical unit to the cloud storage network (408). For example, the cloud storage array device 306 sends the snapshot to the cloud storage network 304 to be stored with the snapshots 342.

Figure 5:
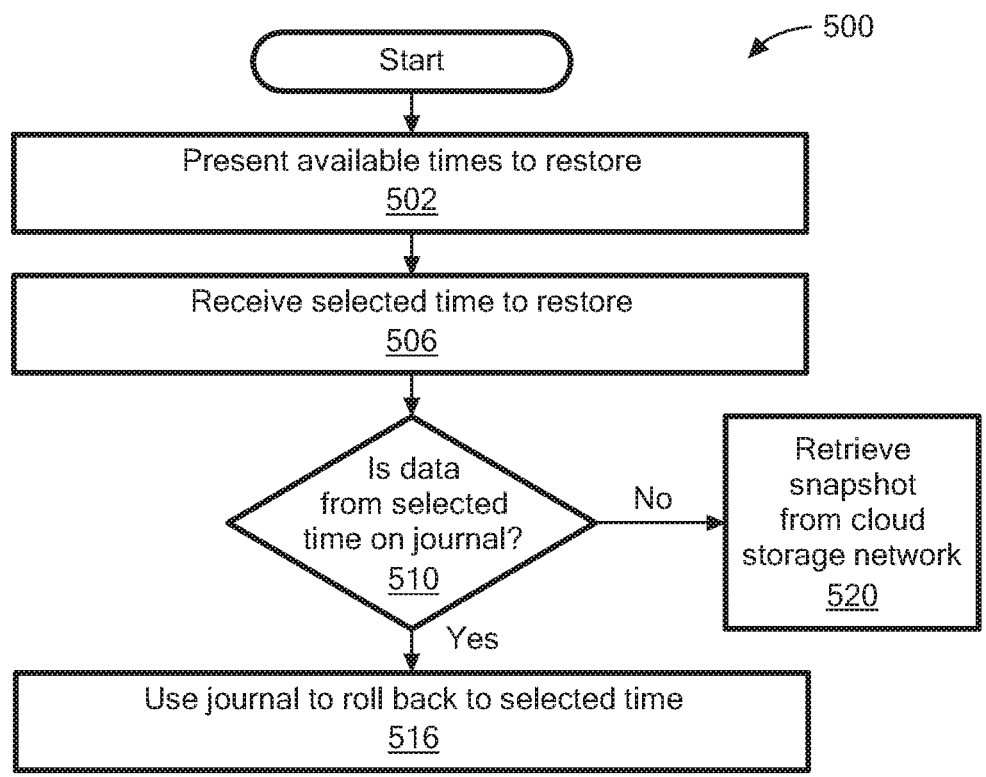
FIG. 5 is a flowchart of an example of a process to retrieve data in a cloud environment, according to one embodiment of the disclosure.

Referring to FIG. 5, a process 500 is an example of a process to retrieve data in a cloud environment, according to one embodiment of the disclosure. Process 500 presents available point-in-time to restore (502). For example, system 300 renders (e.g., using a UI 708 (FIG. 7)) available points-in-time to restore. Process 506 receives a selected time to restore (506). For example, a user (using the UI 708 (FIG. 7) selects a point-in-time to restore.

Process 500 determines if the data for the selected time is on the journal (510). For example, the journal 329 saves data no longer than a day. If the selected time is greater than one day, then the data is not saved on the journal 329.

If the data is saved on the journal 329, process 500 performs a roll back locally using the journal 329 (516). For example, the system 300 rolls back to the selected point-in-time using the processes described in FIGS. 1 and 2. In one example, the journal 329 is used to roll back the virtual machine disk 333.

If the data is not saved on the journal 329, process 500 retrieves the snapshot of the VMs from the cloud storage network 304 for the selected time (520). For example, a point-in-time snapshot (e.g., snapshot 343) of LU 338, is exposed to hosts 302a, 302b, the file system 331 is mounted on the snapshot (e.g., snapshot 343), and a virtual machine is configured to use the copy of the data in the newly exposed file system. In one example, if the data requested is not in the journal then a few selected snapshots that are stored in the cloud storage network are available, but not any point-in-time snapshot as the journal allows.

Figure 6:
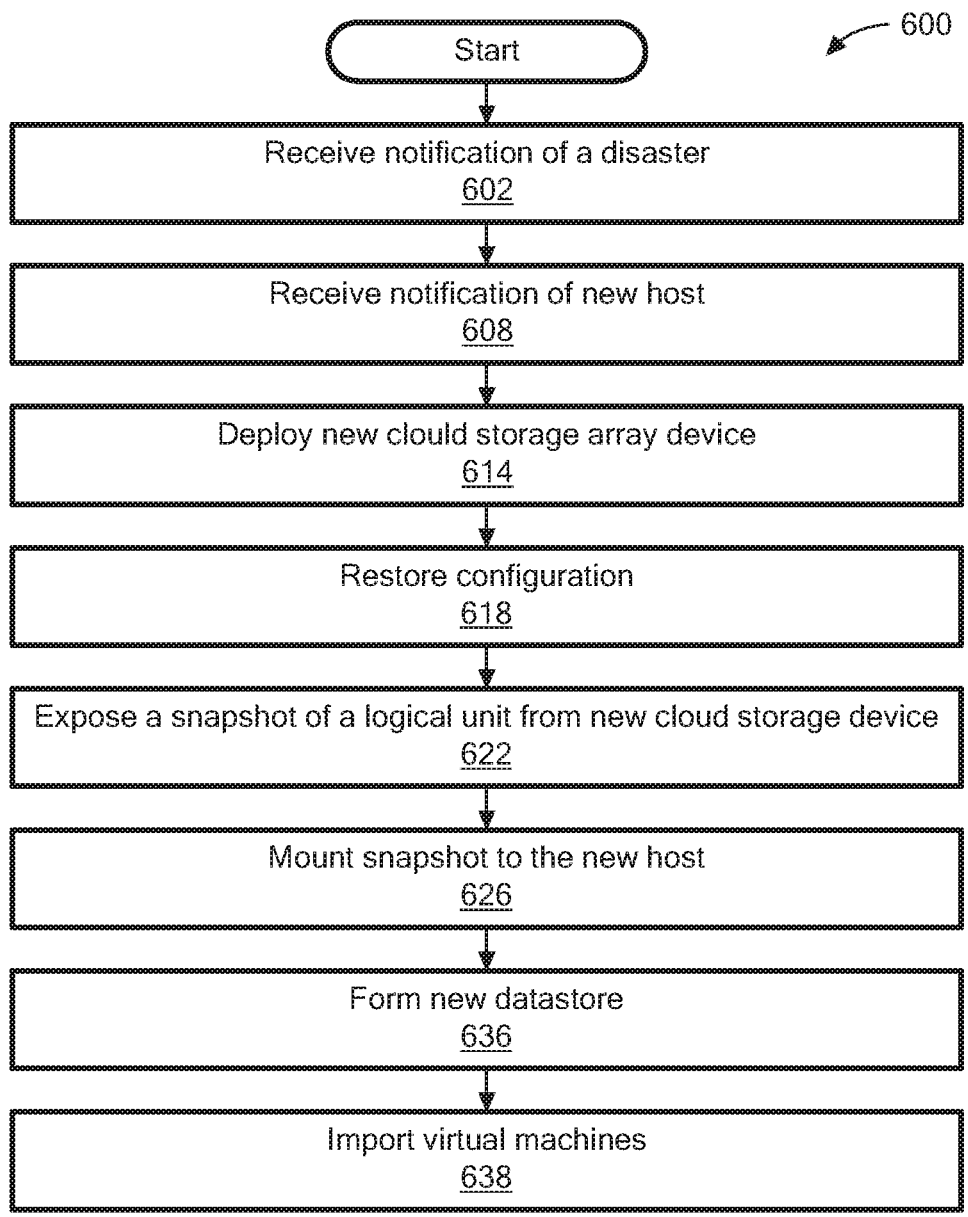
FIG. 6 is a flowchart of an example of a process to perform disaster recovery in a cloud environment, according to one embodiment of the disclosure.

Referring to FIG. 6, a process 600 is an example of a process to perform disaster recovery, according to one embodiment of the disclosure. Process 600 receives a notification of a disaster (602) For example, a production site is lost, and a new production site is generated, and receives notification of a new host (608). For example, a new ESX host (not shown) is configured in the new site.

Process 600 deploys new cloud storage array device (614) and restores configuration of the cloud array storage device (618). For example, a new cloud array storage device (not shown) is configured using to use the cloud storage network 304 and retrieve the volume data 348 and its snapshot copies.

Process 600 exposes a snapshot from cloud network (622) and mounts the snapshot to the new host (626). For example, the latest snapshot from the snapshots 342 is exposed and is mounted by the new host.

Process 600 forms new data store (636). For example, a new data store is formed on the new cloud storage array device.

Process 600 imports virtual machines (638). For example, the virtual machines are imported from the newly created data store. In one example, since cloud data store performance may be poor, a storage mechanism (e.g., VMWARE® STORAGE VMOTION™) or any other copy mechanism may be used to move data into a production data store on new host. In one example, the copy mechanism is performed automatically without user intervention.

Figure 7:
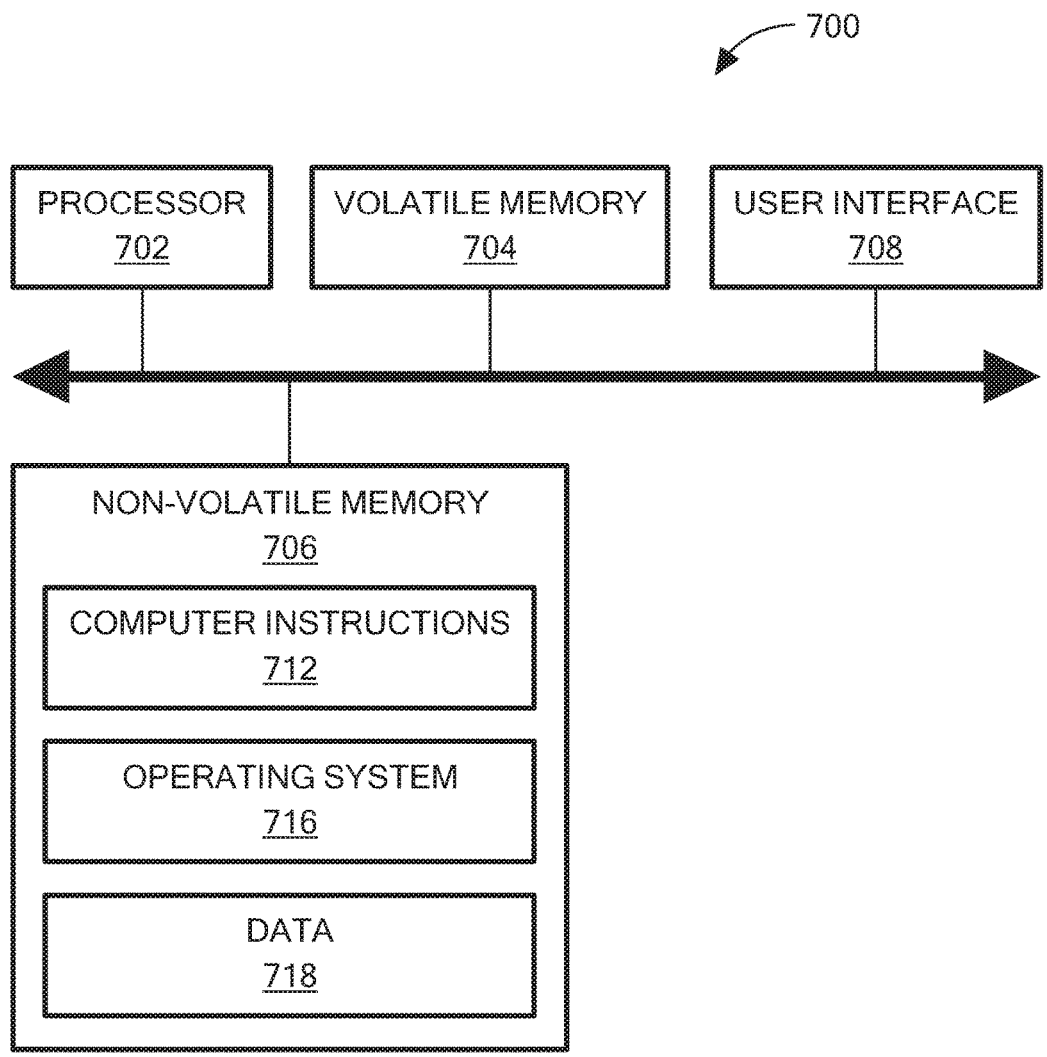
FIG. 7 is a simplified block diagram of an example of a computer on which any or part of the processes of FIGS. 4 to 6 may be implemented, according to one embodiment of the disclosure.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 400, 500 and 600).

The processes described herein (e.g., processes 400, 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 500 and 600 are not limited to the specific processing order of FIGS. 4 to 6, respectively. Rather, any of the processing blocks of FIGS. 4 to 6 may be re-ordered, combined or removed, performed in parallel or in serial, as necessary, to achieve the results set forth above.

The processing blocks (for example, in the processes 400, 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   storing a first virtual machine disk in a first logical unit stored on a data store;
   replicating the first virtual machine disk used by a first virtual machine at a second virtual machine disk stored on a second logical unit on a cloud array storage device;
   storing changes to the first virtual machine disk on a journal stored on the data store wherein the journal comprises;
   a first stream corresponding to new data written to the first virtual machine disk;

a second stream corresponding to metadata associated with write transactions to the first virtual machine disk;
a third stream corresponding to old data overwritten on the first virtual machine disk; and
a fourth stream corresponding to a date and time, a write size, and a beginning address associated with old overwritten data;
periodically rolling each virtual machine disk of virtual machines on the second logical unit to a same-point-in-time using the journal and taking a snapshot of the second logical unit at the same point-in-time; and
sending the snapshots to a cloud storage network.

2. The method of claim 1, further comprising:
receiving a request to retrieve data from a selected point-in-time;
determining if data for the selected point-in-time is in the journal;
rolling back the data to the selected point-in-time using the journal if the data for the selected point-in-time is on the journal; and
retrieving a snapshot from the selected point-in-time from the cloud storage network if the data for the selected point-in-time is not on the journal.

3. The method of claim 2, wherein if the data for the selected point-in-time is not on the journal, the retrieving the snapshot from the cloud storage network comprises:
exposing the snapshot to a host;
mounting a file system; and
configuring the first virtual machine.

4. The method of claim 1, further comprising:
receiving notification of a disaster;
receiving notification of a new host;
deploying a new cloud storage device;
restoring configurations of an old cloud storage device to the new cloud storage device;
exposing a snapshot of the second logical unit;
allowing the new host to mount the snapshot of the second logical unit;
forming a new data store on the new cloud storage device; and
importing the virtual machines on to the new cloud storage device.

5. The method of claim 4, wherein importing the virtual machines comprises importing the virtual machines from the data store using a copy mechanism.

6. An apparatus, comprising:
electronic hardware circuitry configured to:
store a first virtual machine disk in a first logical unit stored on a data store;
replicate the first virtual machine disk used by a first virtual machine at a second virtual machine disk stored on a second logical unit on a cloud array storage device; store changes to the first virtual machine disk on a journal stored on the data store, wherein the journal comprises;
a first stream corresponding to new data written to the first virtual machine disk;
a second stream corresponding to metadata associated with write transactions to the first virtual machine disk;
a third stream corresponding to old data overwritten on the first virtual machine disk; and
a fourth stream corresponding to a date and time, a write size, and a beginning address associated with old overwritten data;
periodically roll each virtual machine disk of virtual machines on the second logical unit to a same-point-in-time using the journal and taking a snapshot of the second logical unit at the same point-in-time; and
send the snapshots to a cloud storage network.

7. The apparatus of claim 6, wherein the circuitry comprises at least one of a processor, a memory, a programmable logic device or a logic gate.

8. The apparatus of claim 6, further comprising circuitry configured to:
receive a request to retrieve data from a selected point-in-time;
determine if data for the selected point-in-time is in the journal;
roll back the data to the selected point-in-time using the journal if the data for the selected point-in-time is on the journal; and
retrieve a snapshot from the selected point-in-time from the cloud storage network if the data for the selected point-in-time is not on the journal.

9. The apparatus of claim 8, wherein circuitry configured to retrieve the snapshot from the cloud storage network if the data for the selected point-in-time is not on the journal comprises circuitry configured to:
expose the snapshot to a host;
mount a file system; and
configure the first virtual machine.

10. The apparatus of claim 6, further comprising circuitry configured to:
receive notification of a disaster;
receive notification of a new host;
deploy a new cloud storage device;
restore configurations of an old cloud storage device to the new cloud storage device;
expose a snapshot of the second logical unit;
allow the new host to mount the snapshot of the second logical unit;
form a new data store on the new cloud storage device; and
import the virtual machines on to the new cloud storage device.

11. The apparatus of claim 10, wherein the circuitry configured to import the virtual machines comprises circuitry configured to import the virtual machines from the data store using a copy mechanism.

12. An article comprising:
a non-transitory computer-readable medium that stores computer-executable instructions, the instructions causing a machine to:
store a first virtual machine disk in a first logical unit stored on a data store;
replicate the first virtual machine disk used by a first virtual machine at a second virtual machine disk stored on a second logical unit on a cloud array storage device; store changes to the first virtual machine disk on a journal stored on the data store wherein the journal comprises;
a first stream corresponding to new data written to the first virtual machine disk:
a second stream corresponding to metadata associated with write transactions to the first virtual machine disk;
a third stream corresponding to old data overwritten on the first virtual machine disk; and
a fourth stream corresponding to a date and time, a write size, and a beginning address associated with old overwritten data;

periodically roll each virtual machine disk of virtual machines on the second logical unit to a same-point-in-time using the journal and taking a snapshot of the second logical unit at the same point-in-time; and send the snapshots to a cloud storage network.

13. The article of claim 12, further comprising instructions causing the machine to:

receive a request to retrieve data from a selected point-in-time;

determine if data for the selected point-in-time is in the journal;

roll back the data to the selected point-in-time using the journal if the data for the selected point-in-time is on the journal; and retrieve a snapshot from the selected point-in-time from the cloud storage network if the data for the selected point-in-time is not on the journal.

14. The article of claim 13, wherein instructions causing the machine to retrieve the snapshot from the cloud storage network if the data for the selected point-in-time is not on the journal comprises instructions causing the machine to:

expose the snapshot to a host;

mount a file system; and configure the first virtual machine.

15. The article of claim 12, further comprising instructions causing the machine to:

receive notification of a disaster;

receive notification of a new host;

deploy a new cloud storage device;

restore configurations of an old cloud storage device to the new cloud storage device;

expose a snapshot of the second logical unit;

allow the new host to mount the snapshot of the second logical unit;

form a new data store on the new cloud storage device; and import the virtual machines on to the new cloud storage device.

16. The article of claim 15, wherein the instructions causing the machine to import the virtual machines comprises instructions causing the machine to import the virtual machines from the data store using a copy mechanism.

* * * * *